United States Patent [19]

Hartl et al.

[11] Patent Number: 4,677,651
[45] Date of Patent: Jun. 30, 1987

[54] ROTARY ANODE X-RAY TUBE HAVING A SLIDING BEARING

[75] Inventors: Walter A. M. Hartl; Diethard A. Peter; Klaus H. Reiber, all of Hamburg, Fed. Rep. of Germany

[73] Assignee: U.S. Philips Corporation, New York, N.Y.

[21] Appl. No.: 678,327

[22] Filed: Dec. 5, 1984

[30] Foreign Application Priority Data

Dec. 5, 1983 [DE] Fed. Rep. of Germany ....... 3343886

[51] Int. Cl.$^4$ .............................................. H01J 35/10
[52] U.S. Cl. ...................................... 378/132; 378/133
[58] Field of Search ............... 378/132, 133, 130, 127; 384/597

[56] References Cited

U.S. PATENT DOCUMENTS

| 3,878,395 | 4/1975 | Seifert et al. | 378/132 |
| 3,942,059 | 3/1976 | Tran-Quang | 378/132 |
| 4,081,707 | 3/1978 | Hartl et al. | 378/132 |
| 4,393,511 | 6/1983 | Jens | 378/132 |
| 4,413,356 | 11/1983 | Hartl | 378/132 |

FOREIGN PATENT DOCUMENTS 0038547 3/1982 Japan ................................... 378/132

Primary Examiner—Craig E. Church
Assistant Examiner—David P. Porta
Attorney, Agent, or Firm—David R. Treacy

[57] ABSTRACT

The invention relates to a rotary anode X-ray tube having a sliding bearing and a further bearing system. The further bearing system, preferably a magnetic bearing, is constructed so that it can absorb substantially entirely the axial and radial bearing forces, while the sliding bearing, which is preferably constructed as a spiral groove bearing with liquid metal lubrication, is shaped so that it absorbs the bearing forces only for a small fraction. It therefore has only a low friction, but it permits the supply of the anode current and especially an effective cooling of the anode disk.

10 Claims, 2 Drawing Figures

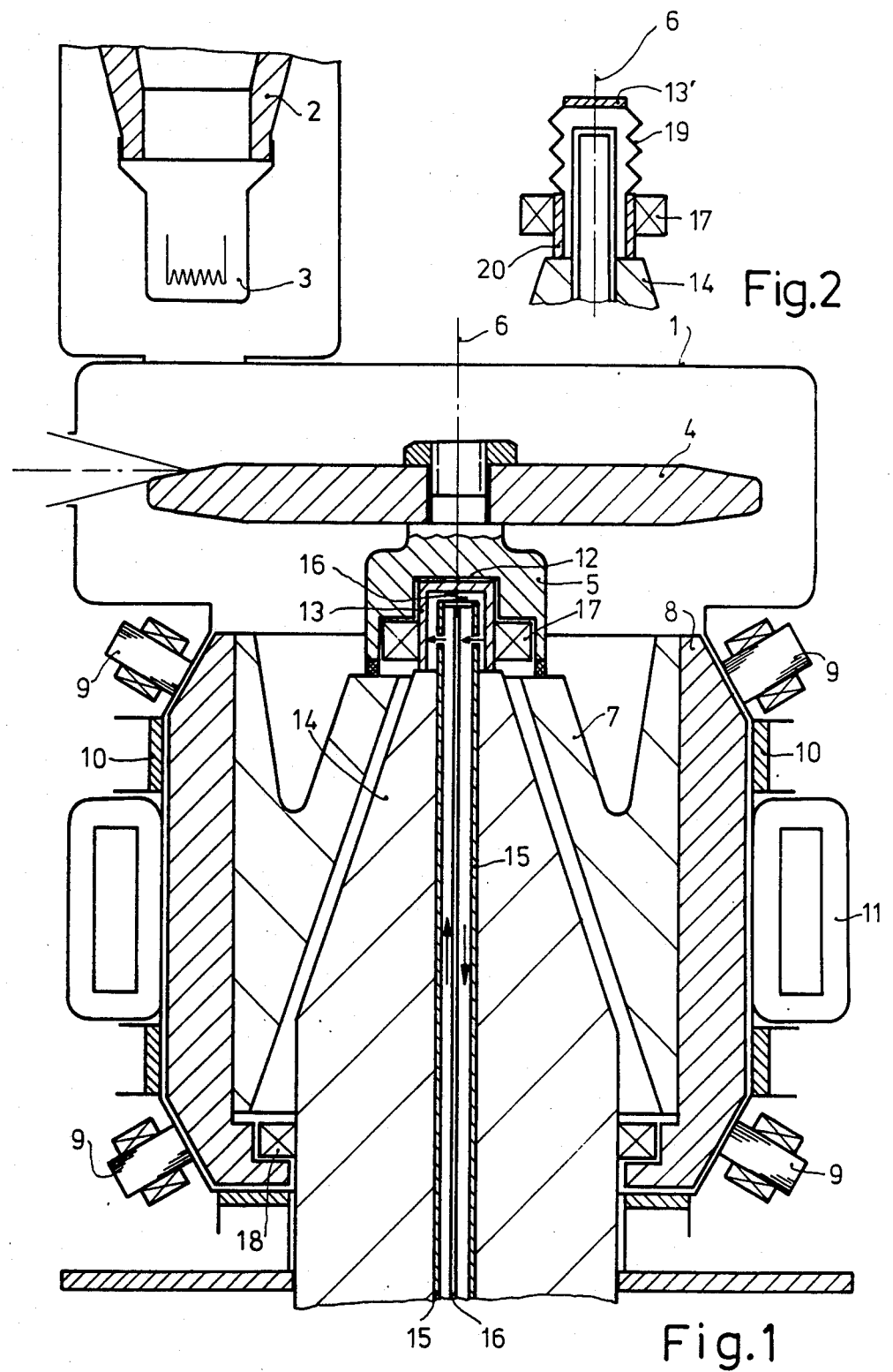

ROTARY ANODE X-RAY TUBE HAVING A SLIDING BEARING

The invention relates to a rotary anode X-ray tube having a sliding bearing, which comprises between a rotating part and a stationary part a layer of a liquid metal or a liquid metal alloy, and a further bearing system.

Such a rotary anode X-ray tube is known from DE-OS No. 3017291 corresponding to U.S. Pat. No. 4,357,555. The sliding bearing in this case absorbs the radially acting bearing forces, while the further bearing system, which comprises a magnetic bearing, absorbs the axially acting forces.

The advantage of such an X-ray tube resides in the fact that the high voltage for the rotary anode can be supplied through the sliding bearing and that the sliding bearing can be used at the same time to dissipate the heat occurring at the area of the sliding bearing. A disadvantage of the X-ray tube is, however, that the sliding bearing causes comparatively large frictional forces because this sliding bearing has to absorb the whole of the radially acting forces; however, the larger the carrying capacity of a sliding bearing, the larger is also its friction. If in such a rotary anode X-ray tube the anode disk, as indicated in the said publication, should rotate steadily, for example during a whole working-day, the tube current and the tube voltage being switched on and off according to need, an additional electrical power has to be applied to overcome this friction. This electrical power is converted in the X-ray tube into heat so that the sliding bearing and, as the case may be, also the rotary anode are heated thereby.

The present invention has for its object to construct the X-ray tube mentioned in the opening paragraph so that the tube current can also be supplied and the heat current can be dissipated through the sliding bearing and the friction losses are reduced.

According to the invention, this object is achieved in that the further bearing system is constructed so that it can absorb entirely the axial and radial bearing forces produced by the rotary anode. The sliding bearing is shaped so that with a rotating anode it absorbs at any rate the bearing forces in the axial direction and in the radial direction for a small fraction.

According to the invention, the bearing forces occurring during operation can consequently be absorbed entirely by the further bearing system; the sliding bearing does not have and does not require a carrying function. Therefore, it can be constructed for use with very small bearing forces, which reduces considerably the friction occurring during operation.

Essentially, the further bearing system may comprise one or more ball-bearings. The advantage of such an embodiment consists in that the electrical current and the heat current must not be dissipated through the ball-bearing, but can be dissipated through the sliding bearing, which reduces considerably the thermal load of the ball-bearings. However, the invention can be used particularly advantageously in X-ray tubes which have as a further bearing system a magnetic bearing system and in which the rotary anode rotates steadily during a working-day because then comparatively little energy is required to maintain a constant speed of rotation.

The friction in a sliding bearing depends upon several parameters. A parameter is, for example, the size of the surface area of the stationary part and of the rotating part, respectively, which are coupled to each other through the liquid metal layer. The larger this surface area, the larger is the carrying capacity of the bearing, but the larger is also its friction. This surface area is therefore dimensioned so small that it is just sufficient to dissipate the heat current occurring during operation. A further parameter determining the friction is the peripheral speed at the area of the sliding bearing. The lower the peripheral speed, the smaller are friction and carrying capacity. The sliding bearing should therefore be located as far as possible in the axis of rotation. Finally, friction and carrying capacity are also determined by the distance between the rotating part and the stationary part of the sliding bearing. The larger this distance, the smaller is its friction, but the smaller is also its carrying capacity.

The further bearing system can now be arranged so or—in the case of a magnetic bearing system—can be operated so that a comparatively large gap is obtained between the stationary part and the rotating part of the magnetic bearing. However, a high precision in the manufacture and in the control of the position in a magnetic bearing is then assumed. However, even if these stringent requirements should be satisfied, the friction in the bearing could increase in an undesired manner if the speed at which the rotary anode X-ray tube is operated should be increased. A further embodiment of the invention is therefore characterized in that the stationary part of the sliding bearing is carried by a resilient part, preferably by a set of metal bellows, which is connected to a stationary part of the X-ray tube.

The bearing forces absorbed by a sliding bearing thus arranged and hence also the friction are limited by the resilience of the part to which the stationary part of the sliding bearing is secured. If the speed should then be increased, the hydrodynamic pressure in the sliding bearing would be increased, which would result in that the resilient part would be deformed so that the distance between the rotating part and the stationary part of the sliding bearing would be increased, which can compensate again at least in part the increase in friction determined by the increased speed. If the stationary part of the sliding bearing is secured to a resilient set of bellows, the carrying capacity and the friction of the sliding bearing can be further reduced in that a spring is arranged in the interior of the set of metal bellows so that the force produced by the differential pressure between the atmospheric pressure and vacuum on the set of bellow can be eliminated again at least in part thereby.

The invention will now be described more fully with reference to the drawing. In the drawing:

FIG. 1 shows an X-ray tube according to the invention, and

FIG. 2 shows a preferred embodiment of a part of such an X-ray tube.

The X-ray tube shown in FIG. 1 has a metal envelope 1, to which the cathode 3 applied to negative potential is secured by means of an insulator 2. The rotary anode system comprises an anode disk 4, which can be rotated about the axis of rotation 6 by means of a driving shaft 5. The driving shaft 5 is connected to a rotor 8 through a ceramic insulator 7. A magnetic bearing system is arranged about the rotor 8. It comprises a number of coils 9 which are arranged in a suitable manner and which position the rotor 8 in a predetermined manner, as well as sensors 10 which control the energization of the coils 9. Thus, the rotor 8 can be brought into an accurately defined position. Such magnetic bearing systems are known, more particularly when in conjunction with rotary anode X-ray tubes, especially tubes whose rotor is connected through an insulator to the driving shaft of the anode disk (cf. U.S. Pat. No. 357,555).

A stator 11 produces electrical power for driving the rotor 8 and the anode disk 4, respectively. It is arranged on the metal envelope 1 about the rotor 8. The rotary anode X-ray tube is preferably operated in the continuous mode, that is to say it is brought to the required speed at the beginning of a working-day and is then kept at this speed. During exposure, only the tube voltage and the tube current are switched on. This continuous mode has the advantage as compared with the short-time mode, in which the anode disk is accelerated to the required speed immediately before the beginning of an exposure, that considerably lower powers and hence also smaller stators are required for acceleration; however, it is then assumed that only small frictional forces are produced.

The driving shaft 5 has a cylindrical bore, which is limited towards the anode disk 4 by a circular end face 12 which extends concentrically and perpendicularly to the axis of rotation 6. This bore encloses a pot 13, i.e. a cyclindrical part which is concentric to the axis of rotation 6 and which is closed towards the anode disk 4 by a circular disk parallel to the face 12. This pot 13 is located at the end of a stationary conical ceramic insulator 14, which projects into a correspondingly formed conical recess of the rotating ceramic insulator 7.

A gap is defined between the end face 12 of the driving shaft 5 rotating during operation and the parallel and stationary bottom surface of the pot 13 facing it. The gap accommodates a layer (not shown) of a liquid metal or a liquid metal alloy, which constitutes together with the two surfaces a sliding bearing. This sliding bearing is preferably in the form of a so-called spiral groove bearing. For this purpose, for example, spiral grooves are provided in the end face 12, which ensure that the liquid layer is pressed inwards, i.e. towards the axis of rotation 6, if the anode disk 4 rotates in a given direction (in the opposite direction the anode disk is not allowed to rotate because otherwise the liquid metal or the liquid metal alloy would flow out). Such spiral groove bearings are also known in principle in conjunction with rotary anode X-ray tubes (cf. inter alia DE-OS No. 3017291).

This sliding bearing, which in any case is not capable of absorbing radially acting forces, is constructed so that in the operating condition, that is to say when the anode disk rotates, it absorbs only a small fraction of the axially acting bearing forces, therefore only small frictional losses occur in this bearing. The rotary anode system is journalled by means of the magnetic bearing system of coils 9 and sensors 10.

Consequently, the sliding bearing has practically no bearing function. It rather serves for dissipating the heat produced in the anode disk and at the same time serves as a contact for supplying the high-voltage potential. The heat dissipation takes place by means of a cooling agent, which passes along the inner surfaces of the pot 13. It is supplied and conducted away by means of a metal tube 15, which is arranged in the interior of the insulator 14. Metal tube 15 is concentrically arranged to the axis of rotation 6 and is subdivided in a longitudinal direction by an intermediate wall 151. It projects into the pot 13 and is closed by a perpendicular end face. The cooling agent enters and leaves through openings in the side wall in a manner such that in the interval between emanation from and re-entry into the tube it passes along the inner surfaces of the pot 13 and thus cools the latter. A spring 16, which contacts the metal tube 15 and the pot 13, ensures that the anode disk 4, which may rotate, and the metal tube 15 are electrically connected to each other so that the high voltage for the anode disk can be supplied through the tube 15.

On the outer periphery of the pot 13, a ball-bearing 17 is arranged at a small distance from the inner surface 12 of the driving shaft 5. Similarly, on the outer periphery of the insulator 14 a ball-bearing 18 is arranged at a small distance from the ends of the rotor 8. These ball-bearings absorb the bearing forces exerted by the rotary anode either if during operation the magnetic bearing system 9, 10 falls—for example during an interruption of the voltage supply—or if the magnetic bearing system 9, 10 is switched off. Although the upper ball-bearing 17 is located only at a small distance from the anode disk 4, it is protected from excessively high temperatures because the heat is dissipated through the sliding bearing and the flow of cooling agent.

In principle, it would be possible to connect the rotor 8 in an electrically conducting manner to the driving shaft 5 and to the anode disk 4, respectively, so that in operation it would be also applied to high-voltage potential and the insulator 7 could be omitted. In this case, however, a larger gap between the envelope 1 and the rotor 8 would be required, which would result in the operation of the magnetic bearing becoming much more difficult. Due to the fact that the ceramic insulator 7 is arranged between the rotor 8 and the anode disk 4, the rotor 8 can be applied to ground potential (so that the distance from the envelope wall can be small) and the anode disk 4 can be operated at high-voltage potential. In order to avoid having the rotor 8 assume high-voltage potential due to leakage currents or the like, means have to be provided which ensure that on the rotor 8 at least approximately the same potential is adjusted as on the envelope 1, i.e. ground potential. Such mens are described, for example, in DE-OS No. 2601529. Moreover, the rotor 8 could also be connected to ground through a magnetically operable slip contact which is always switched only when the X-ray tube is applied to high voltage.

The embodiment having a rigid pot 13 shown in FIG. 1 imposes stringent requirements inter alia on the accuracy with which the rotor 8 and the parts following its rotation are positioned by the magnetic bearing system 9, 10. If these requirements are not satisfied, the width of the gap of the sliding bearing can fluctuate comparatively strongly. More particularly, it tends to decrease, which results in a considerable increase of the friction. Such an increase of friction can moreover also be obtained if the speed of the anode disk is increased above the value for which the sliding bearing is constructed.

FIG. 2 shows a modification of the stationary part of the sliding bearing of FIG. 1, in which these problems do not occur. The stationary part of the sliding bearing, designated by reference numeral 13' in FIG. 2, is now in fact not rigidly connected to the insulator 14, but is secured to one end of a set of elastic metal bellows 19. The other end of the bellows 19 is connected to a stable ring 20, which in turn is secured on the insulator 14 and carries the bearing 17. The stationary part 13' of the sliding bearing can consequently be displaced in axial direction against the spring force of the set of metal bellows 19. The force transferred between the surfaces 12 and 13' is consequently determined by the pre-stress of the metal bellows and by the pressure force exerted by the flow of cooling agent on the part 13'. The resulting overall force can be adjusted so that it corresponds to only a fraction of the weight of the rotary anode 4, for example one tenth of its weight. As the case may be, this pressure force may be reduced by a tensile spring arranged in the interior of the set of metal bellows.

If in this construction the speed of the anode disk 4 is increased, forces can occur, which are larger than the pressure force acting upon the disk-shaped part 13'. The set of metal bellows is thus compressed so that the gap between the end face 12 and the surface 13' is enlarged until the force transferred through the sliding bearing corresponds to the force exerted by the metal bellows and the liquid pressure. The force transferred via this bearing therefore cannot exceed a predetermined value and consequently cannot exceed either the friction in this bearing.

The same principle applies when the rotary anode 4 is not exactly held in the predetermined position by the magnetic bearing. The surface 13' follows all the position variations of the rotary anode 4 in axial direction because of the pre-stress. The frictional losses also in this case do not exceed the value given by the pre-stress. When in inoperative periods the current through the magnetic bearing system is switched off, the weight of the rotary anode compresses the set of bellows until the rotary anode bears on the bearing 17.

What is claimed is:
1. A rotary anode X-ray tube comprising:
   a stationary part;
   a rotary anode part rotatably arranged about the stationary part;
   a sliding bearing means located between the stationary part and the rotary anode part, having a layer of liquid metal or liquid metal alloy;
   a further bearing means axially and radially supporting and aligning the rotary anode part in a predetermined manner relative to the stationary part;
   the further bearing means substantially absorbing any axial and radial bearing forces produced by the rotary anode part, the sliding bearing means comparatively absorbing a small fraction of the axial and radial bearing forces, the sliding bearing means principally dissipating the heat produced by the rotary anode part and electrically contacting the rotary anode part to a high-voltage potential.

2. A rotary anode X-ray tube as claimed in claim 1 characterized in that the further bearing means comprises one or more ball bearings.

3. A rotary anode X-ray tube as claimed in claim 1, characterized in that the sliding bearing has a surface (12, 13') traversed perpendicularly by the axis of rotation of the rotary anode part.

4. A rotary anode X-ray tube as claimed in claim 1, characterized in that a cooling agent circulates within the sliding bearing means to dissipate the heat produced by the rotary anode part.

5. A rotary anode X-ray tube as claimed in claim 4, characterized in that said stationary part includes a high-voltage insulator and a tube (15) situated in said high-voltage insulator (14) transfers the cooling agent to the sliding bearing means.

6. A rotary anode X-ray tube as claimed in claim 4, characterized in that the tube (15) conduct electrical current to the rotary anode disk (4).

7. A rotary anode X-ray tube as claimed in any one of claims 1, 3, 4, 5, and 6, characterized in that a resilient means couples the sliding bearing means to the stationary part, the resilient means being preferably a set of metal bellows.

8. A rotary anode X-ray tube as claimed in claim 1, characterized in that the further bearing means comprises a magnetic bearing system.

9. A rotary anode X-ray tube as claimed in claim 1 10 and 7, characterized in that the sliding comprises a spiral groove bearing.

10. A rotary anode X-ray tube as claimed in claim 9 characterized in that a rotor (8) of the rotary anode X-ray tube is connected through an insulator (7) to an anode disk (4) of the rotary anode part.

* * * * *